(12) United States Patent
Martin

(10) Patent No.: US 6,970,702 B1
(45) Date of Patent: Nov. 29, 2005

(54) CELLULAR COMMUNICATIONS DRIVE TEST SYSTEM AND METHOD

(75) Inventor: Dannie E. Martin, Casselberry, FL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 745 days.

(21) Appl. No.: 09/670,195

(22) Filed: Sep. 26, 2000

Related U.S. Application Data

(63) Continuation-in-part of application No. 09/604,755, filed on Jun. 28, 2000.

(51) Int. Cl.$^7$ .............................................. H04Q 7/20

(52) U.S. Cl. ..................... 455/424; 455/67.7

(58) Field of Search ........................... 455/67.7, 67.11, 455/423, 424; 370/241, 244, 250; 375/213

(56) References Cited

U.S. PATENT DOCUMENTS

| | | | |
|---|---|---|---|
| 5,987,306 A * | 11/1999 | Nilsen et al. | 455/67.11 |
| 6,263,187 B1 * | 7/2001 | Do | 455/9 |
| 6,751,457 B1 * | 6/2004 | Martin | 455/424 |

* cited by examiner

*Primary Examiner*—Lee Nguyen
(74) *Attorney, Agent, or Firm*—Cantor Colburn LLP

(57) ABSTRACT

A system for and method of cellular telephone system monitoring includes a cellular switch which is remotely accessed and placed in a call monitor mode. A GPS receiver is connected to a mobile telephone via an interface unit. Call performance information (e.g., signal strength, BER and call events) are recorded at the switch and downloaded to a remote computer that includes a display. GPS location information is transmitted by the mobile telephone and received by the remote computer via the switch. The computer receives and stores the recorded call and GPS information and graphically displays this information, along with a map indicating the location of the mobile telephone. Preferably, the call information is first parsed, converted and/or scaled to conform to a standard file format.

26 Claims, 8 Drawing Sheets

```
07:42:00              CLR  Call Monitor: Call RSSI value
4113              Source: 6        CCPO
                              (407) 3250010 cell 201 frssi -81 rrssi -83 attn 2
fber 0 rber 0                 Object: 20      A              TC 780
                              Class: XXXXXXXXXXXX
Domain:2                      BTS:1    Chassis:       Slot:0    Port:
007:42:00             CLR  Call Monitor: Adjacent cell RSSI values from mobile
4116              Souce: 6         CAP2
                              (407) 3250010 Cell_id/RSSI: 32/-97 202/-113 491/-103
Object: 6             CAP2
                              Class: XXXXXXXXXXXX
Domain:2                      Chassis: 6      Slot: 11         Port:
07:42:00              CLR  Call Monitor: Adjacent call RSSI values from mobile
4116              Source: 6        CAP2
                              (407) 3250010 Cell id/RSSI: 412/ -87 323/ -109 203/ -103
Object: 6             CAP2
                              Class: XXXXXXXXXXXX
Domain:2                      Chassis:6       Slot:11          Port:
007:42:00             CLR  Call Monitor: Adjacent cell RSSI values from mobile
4116              Source: 6        CAP2
                              (407) 3250010 Cell id /RSSI: 1353/-113
Object: 6             CAP2
                              Class: XXXXXXXXXXXX
Domain:2                      Chassis:6       Slot:11          Port:
07:42:01              CLR  Call Monitor: Call RSSI value
4113              Source: 6        CCPO
                              (407) 3250010 cell 201 frssi -81 rrssi -84 attn 2
fber 0 rber o                 Object: 20      A              TC 780
                              Class: XXXXXXXXXXXX
Domain:2                      BTS:1Chassis:         Slot: 0   Port:
07:42:01              CLR  Call Monitor: Call Handoff has taken place
4104              Source: 2        CCPO
                              Ph#: (407) 3250010 Handoff from 201 to         32
Object: 3           B         TC 755
                              Class: XXXXXXXXXXXX
Domain:1                      BTS:2 Chassis:      Slot: 0       Port:
07:42:01              CLR  Call Monitor: Call Path Assigned
4101              Source: 2        CCPO
                              Ph#: (407) 3250010 Handin connect E1: 0, 7 Tl: 0, 4
755 TDMA-3                    Object: 3       B              TC 755
                              Class: XXXXXXXXXXXX
Domain:1                      BTS:2 Chassis:      Slot: 0       Port:
007:42:01             CLR  Call Monitor: Adjacent cell RSSI values from mobile
4116              Source: 6        CAP2
                              (407) 3250010 Cell_id/RSSI: 32/-97 202/-113 491/-101
Object: 6             CAP2
                              Class: XXXXXXXXXXXX
Domain:2                      Chassis:6       Slot:11          Port:
```

FIG. 1
*Prior Art*

STANDARD FILE FORMAT

Subscriber Number
Serving cell site
Channel
Channel type
Mobile power
$F\_RSSI_1, F\_RSSI_2, \ldots, F\_RSSI_n$
$R\_RSSI_1, R\_RSSI_2, \ldots, R\_RSSI_n$
$F\_BER_1, F\_BER_2, \ldots, F\_BER_n$
$R\_BER_1, R\_BER_2, \ldots, R\_BER_n$
$Call\_event_1, Call\_event_2, \ldots, Call\_event_n$
$NEIGHBOR\_RSSI_1, NEIGHBOR\_RSSI_2, \ldots, NEIGHBOR\_RSSI_n$
$TimeStamp_1, Lat/Long_1, \ldots, TimeStamp_n, Lat/Long_n$
:
:
:

Figure 3

CELLULAR COMMUNICATIONS DRIVE TEST SYSTEM AND METHOD

This application is a continuation-in-part application of U.S. application Ser. No. 09/604,755, filed Jun. 28, 2000, which is incorporated by reference herein.

BACKGROUND

1. Field of the Invention

The present invention is directed to management, testing and maintenance of cellular telephone systems. More particularly, the present invention is directed to a system and method for (i) remotely monitoring the call parameters of a mobile cellular telephone call and (ii) displaying those parameters in a dynamic graphical form in real or near real time, wherein the graphical form also includes the mobile cellular telephone's location.

2. Background of the Invention

Unfettered mobile telephone network access, call continuity and call clarity are some of the technical considerations that are continually optimized to achieve a high level of mobile cellular telephone service. To achieve improved performance levels, cellular telephone service providers must position antennas in geographically desirable locations and tune and/or direct the antennas in optimal ways. While radio frequency (RF) engineering tools exist to help properly position individual cellular telephone cell site antennas and configure overall cellular systems, the only effective way of actually determining whether the cellular antennas and their tuning/positioning have been properly accomplished is to perform field tests with a cellular telephone. Typically, such field tests are accomplished with "drive tests" wherein an RF or cellular engineer drives a vehicle around in a designated area while making one or more telephone calls using his mobile cellular telephone. During the drive test, the RF engineer monitors call performance by noting call drops, for example, and/or collecting actual downlink data such as signal strength directly from the mobile telephone. Test equipment for performing such tests is manufactured by, for example, X-Tel, Comarco and LCC.

The RF engineer then returns to his office where he uploads the collected data to, e.g., a computer spreadsheet program, and attempts to combine or correlate this data with data, from the same time period as the drive test, obtained from the cellular system's controller or switch, i.e., a Mobile Telephone Switching Office (MTSO) or Mobile Switching Center (MSC). The data from the switch might include signal strength, Bit Error Rate (BER) and other call events, such as call handoffs, during the time that the RF engineer was performing the drive test.

Once an analysis of the combined data is complete and changes to the cellular system are made (if necessary), the RF engineer will typically return to the drive test area to confirm that the changes made have improved overall system performance. The iterative procedure of drive testing, system changing, and subsequent drive test confirmation continues as long as cellular system subscribers (users) complain about inadequate service or it is believed that improved service, e.g., coverage and continuity, can be achieved.

While the drive test is an effective method for confirming and testing system performance, it is also an extremely inefficient exercise, in terms of time, for an RF engineer. Instead of spending valuable time making calculations and studying data to optimize a cellular system in an office setting, the RF engineer might spend half or even up to two thirds of his day driving to, around and from an area under investigation. This drive test time factor is even more pronounced if the RF engineer must travel to a rural area to investigate customer complaints and/or perform routine system checks. Thus, the drive testing conventionally employed to monitor and upgrade a cellular system's performance wastes an RF engineer's valuable time.

Moreover, even if the data collected by the RF engineer and the switch data are combined in a useful manner for analysis, it is very difficult to ascertain from the foregoing data set the actual location of the mobile telephone at any given time. Such information, however, can be critical to determine precisely where the cellular system has inadequate service. That is, it is important to know, for example, the precise geographical location at which a call drop occurs. However, having only data collected from the mobile telephone and data from the switch cannot provide accurate position location information.

Additionally, the data that is collected from the mobile telephone and switch is often rather "cryptic." Specifically, while individual parameters such as signal strength, BER, etc. are recorded over time by the switch (and where possible, by the mobile telephone itself), these parameters are output from the switch (and/or mobile telephone) as numeric or text data, which is difficult to understand unless one has extensive knowledge of the various codes and formats employed. FIG. 1 shows a typical "feed" of data from a switch. This intelligibility difficulty is compounded by the fact that cellular system providers often deploy switches from different manufactures, e.g., Hughes, Lucent or Ericsson, and each of these manufacturers provides call information data in different formats and in different orders. This makes it particularly difficult to fully appreciate the data that is available, let alone to properly correlate the call information data from the switch with the mobile telephone data, if any, for analysis.

SUMMARY OF THE INVENTION

To overcome the deficiencies in the conventional methods described above, the present invention provides a system and method whereby the RF engineer need not himself conduct a drive test. Instead, someone else can perform the drive test while the RF engineer remotely accesses the Mobile Telephone Switching Office (MTSO) or Mobile Switching Center (MSC) ("the switch"), places the switch in a call monitor mode and captures telephone call information from both the switch and the mobile telephone (when the cellular system is a digital system) without ever having to leave his office. In addition, the location of the mobile telephone is tracked using data obtained from the Global Positioning System (GPS).

The present invention further provides a single, easy to follow, graphical presentation of the captured call information, including geographic position, even though the switches or mobile telephone manufacturer's equipment from which the call monitor information is obtained might vary.

More specifically, the present invention comprises an executable program that runs on a computer, e.g., a personal computer (PC) or workstation. The workstation preferably includes a modem or other communications link whereby the workstation can dial up the switch, issue commands to the switch to cause the switch to collect or capture call information for a particular Mobile Identification Number (MIN), and download that call information to the workstation.

The present invention further comprises a GPS receiver in communication with the mobile cellular telephone that is being monitored. Preferably, the GPS receiver is either mounted on the vehicle in which the mobile telephone is located or is a handheld unit that is in close proximity to the user of the mobile telephone. The location information, and preferably time stamp, received by the GPS receiver is passed through an interface unit that combines received latitude/longitude/time information with reverse channel transmissions emanating from the mobile phone.

Upon receipt of the call information and latitude/longitude/time information (via the switch), the executable program parses the call information depending on the format and order of the call information received in accordance with switch type that has been accessed, converts and/or scales the call information as necessary, loads the resulting data and latitude/longitude/time information into a file using a standard file format, and then graphically displays the data stored in the file, such that the displayed data changes dynamically as new call information data is received.

Preferably, the standard file format includes a mobile service subscriber's number, e.g., a mobile identification number (MIN), the cell site that is presently serving the mobile phone, the channel that is being used, forward and reverse signal strengths, forward and reverse bit error rates, and latitude/longitude/time information.

The standard file format preferably also includes the reverse signal strength at several other cell sites, and most preferably up to 24 cell site neighbors that are in close proximity to the serving cell, in accordance with the digital EIA/TIA 136 specification.

The data stored in the standard file format is then displayed using a graphical user interface including a graphical representation of the data along with alphanumeric information. That is, the retrieved data is displayed in a graphical, dynamic format on a computer display for the user to analyze. The graphical format preferably also includes a map that indicates the location of the mobile cellular telephone.

With the present invention, the RF or cellular engineer no longer needs, himself, to conduct drive tests. Rather, a driver other than the RF engineer can be sent to conduct a drive test while the RF engineer remotely monitors the call from his office. Alternatively, mobile telephones can be pre-positioned in several vehicles (e.g., buses, taxis, and the like) and configured to be in an auto-answer mode, whereby each phone can be monitored as desired.

It is therefore an object of the present invention to provide a cellular communications drive test system and method that captures, from a switch, in real or near real time, call performance information.

It is another object of the present invention to reformat the captured call performance information into a standard format that can be used for all switch types.

It is yet another object of the present invention to provide a cellular communications drive test system and method that dynamically displays call performance information as it is received.

It is another object of the present invention to remotely access a cellular switch and cause it to record and send call performance information for a particular mobile telephone call.

It is also an object of the present invention to provide a cellular communications drive test system and method wherein persons other than RF engineers perform cellular system drive tests.

It is a further object of the present invention to provide a cellular communications drive test system and method that provides a single graphical user interface for call performance information that is obtained via and/or from a switch.

It is another object of the present invention to provide a cellular communications drive test system and method that provides a graphical user interface that not only displays call performance data, but also displays the location of the cellular telephone being monitored.

These and other objects of the present invention will become apparent upon a reading of the following detailed description in conjunction with the accompanying drawings.

BRIEF DESCRIPTION OF THE DRAWINGS

FIG. 1 is a selected portion of downloaded mobile telephone call information obtained from a switch.

FIG. 3 is an exemplary standard file format in accordance with the preferred embodiment of the present invention.

DETAILED DESCRIPTION OF THE INVENTION

Figure 2:
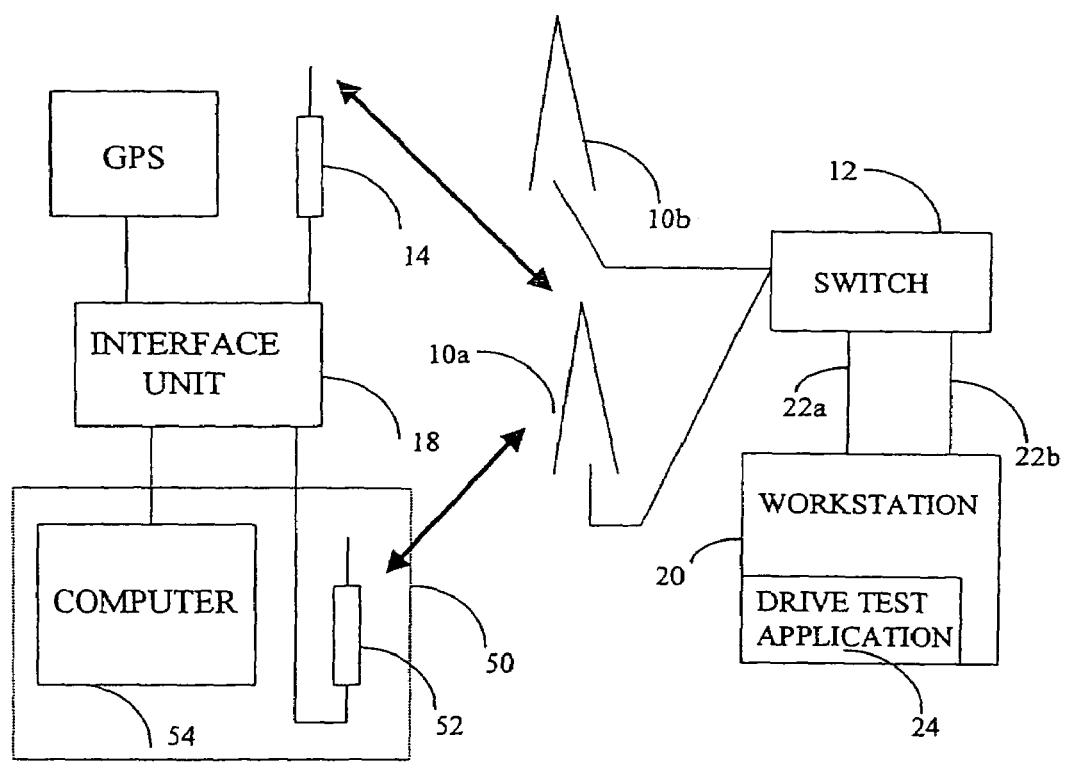
FIG. 2 schematically illustrates the preferred embodiment of the present invention including an optional component of additional computer and mobile cellular telephone.

FIG. 2 schematically illustrates the preferred embodiment of the present invention in which a plurality of cell sites 10a, 10b are in communication with a Mobile Telecommunications Switching Office (MTSO) 12, also sometimes referred to by those skilled in the art as a Mobile Switching Center (MSC), but generally referred to herein as a "switch". Cell sites 10a, 10b monitor signals transmitted by mobile telephone 14 and pass relevant information to the switch, all in conventional manner. This information typically includes signal strength parameters, and bit error rate (BER) information. Based on this received information, the switch assigns a particular cell site, e.g., 10a, to be the present or next (after a handoff) serving cell for a call initiated or to be received by mobile telephone 14.

Also shown in FIG. 2 is a workstation 20, such as a personal computer (PC), on which a program for executing the present invention preferably resides. The program, identified as drive test application 24, is preferably run in combination with well-known modules available in, e.g., Visual BASIC, for performing graphics functions, such as those described below. Workstation 20 is in communication with switch 12 via links 22a and 22b, which may be dedicated telephone lines or any other suitable communication pathway, including wireless links, that permit workstation 20 to communicate with switch 12. Preferably, information about the cellular system, e.g., neighbor cell site signal strengths, is provided via link 22a, whereas specific call information, e.g., BER, related to mobile telephone 14 is provided via link 22b. Of course, those skilled in the art will appreciate that links 22a, 22b could be combined in a single communication pathway between switch 12 and workstation 20. Where necessary, workstation 20 may include a modem (not shown) for effecting communication over the link(s).

In accordance with the present invention, workstation 20 accesses switch 12 to place the switch in a call monitor mode whereby switch 12, upon receiving the appropriate command(s), begins recording call information for a particular mobile call. In the preferred embodiment, the user of workstation 20 identifies a Mobile Identification Number (MIN), e.g., a mobile telephone's telephone number, and uploads that MIN to switch 12. After the MIN is uploaded, switch 12 records call parameter information related to calls being routed to/from the mobile telephone having the identified MIN, e.g., mobile telephone 14.

As is well-known in the art, mobile telephone 14 can also be placed in an automatic call answer mode whereby after, e.g., two rings, the mobile phone automatically answers without intervention by a user. Thus, in accordance with a particular implementation of the present invention, a plurality of mobile telephones 14 are carried by/mounted to, respectively, a plurality of service vehicles such as taxi cabs, delivery trucks, busses and the like, which are always traveling throughout a metropolitan area. The user of workstation 20 can then initiate a call to any one of these mobile telephones, monitor call parameter information, and repeat these action as many times as desired.

FIG. 2 also depicts a GPS receiver 16 that is connected to mobile telephone 14 via interface unit 18. Interface unit 18 calculates latitude, longitude and time information based on data provided by GPS receiver 16. Techniques and circuitry for accomplishing this function are well-known to those skilled in the art. Mobile telephone 14 preferably includes a data input jack whereby the latitude/longitude/time information can be transmitted back to workstation 20 via mobile telephone 14.

In an alternative embodiment, there is also provided auxiliary system 50, which preferably comprises a separate mobile telephone 52 and computer 54, each of which is also connected to interface unit 18. In this alternative embodiment, computer 54 records the call information available from mobile telephone 14 along with the received GPS location information, all via interface unit 18. Preferably mobile telephone 52 is connected to an antenna (not shown) mounted externally to a vehicle involved in the drive test so as to improve, perhaps by 10 or 15 dB, the signal strength of the signal transmitting the call information and GPS information to cell site 10a or 10b. In a preferred embodiment, mobile telephone 52 is configured to be in an auto-answer mode so that the call information from mobile telephone 14 and GPS location information can be obtained substantially in real time, or alternatively, at a later time by transmitting the call and GPS location information that has been recorded by computer 54.

The call parameter information is preferably transmitted to workstation 20 via links 22a, 22b and parsed such that a standard call monitoring file is dynamically created or a database is populated. The standard file or database preferably has a standard file format like that shown in FIG. 3. This standard file format preferably includes a subscriber number, the serving cell site, the channel that is carrying the call, the channel type, forward and reverse signal strengths, and forward and reverse BERs (see FIG. 3). It is noted that BER data is applicable only for a digital cellular system. Also, in an analog cellular system, only reverse signal strength is typically available. However, since there are ongoing efforts on the part of the cellular telephone industry to convert all cellular systems to digital systems, the present invention will generally always be able to receive all of the data described thus far.

Also included with the data coming from switch 12, as a result of it being placed in a call monitor mode, are the signal strengths of other, neighboring, cell sites. This information is preferably also stored in the standard file format of FIG. 3. Further, switch 12 preferably transmits call event information to workstation 20. Call event information includes, for example, indications of hand offs, end call events (e.g., normal end, drop), and new calls. This data is also stored, preferably in the standard file format of FIG. 3.

Finally, the standard file format preferably also includes latitude, longitude and timestamp entries for the GPS location information.

As noted, the data received from switch 12 is preferably parsed to extract only the information that is to be stored in the standard file format. The parsed information is then preferably converted or scaled so that it can be easily displayed in the graphical user interface of the present invention. That is, because each switch manufacturer (e.g., Ericsson, Lucent, Hughes) has a different format and order for their call monitoring data, the present invention preferably includes tables and conversion charts to modify the data received into data that can be easily plotted in accordance with the present invention, as will be explained below. Implementation of such tables and conversion charts are well known to those skilled in the art and depend on the switch being accessed and the type of graph being plotted.

Figure 4A:
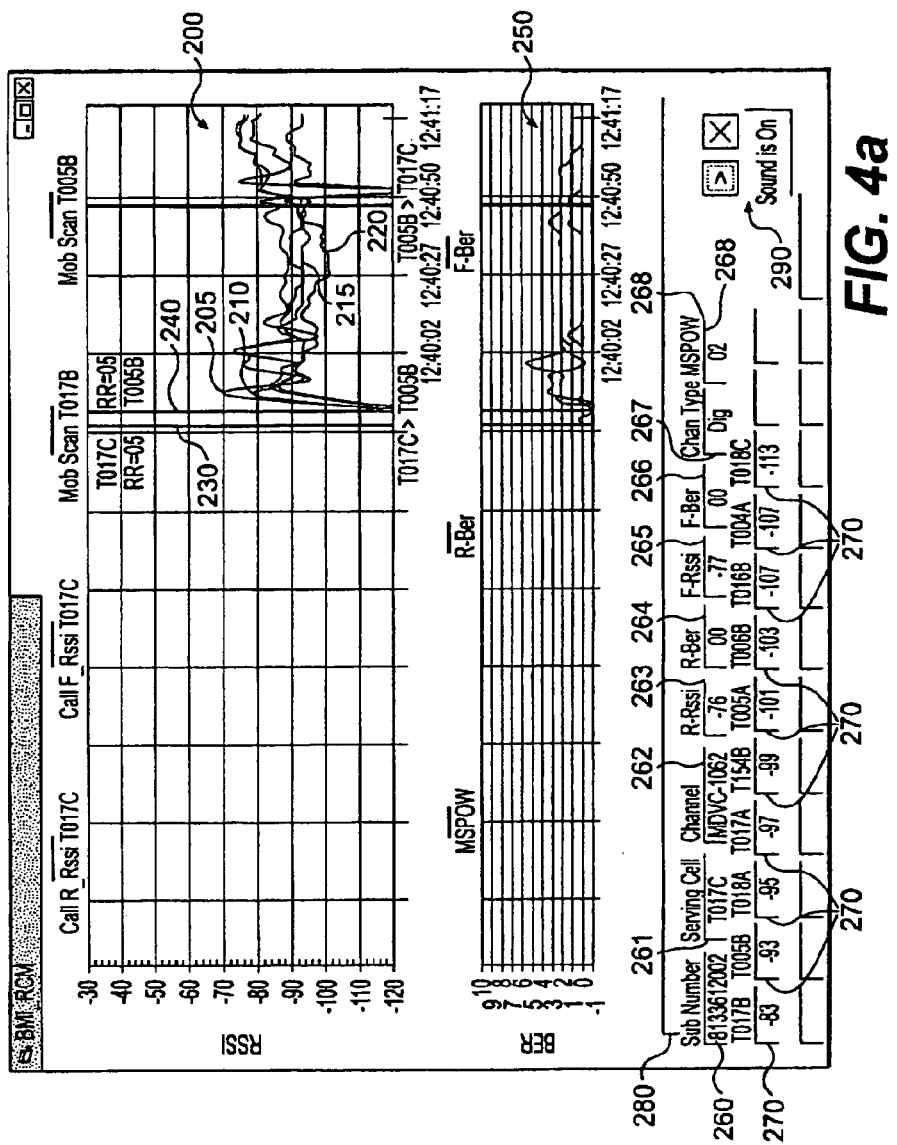
FIGS. 4a and 4b are exemplary displays generated by the preferred embodiment of the present invention for presenting call information only.

FIG. 4a is an exemplary screen display in accordance with the preferred embodiment of the present invention. In the upper portion of FIG. 4a, graph 200 preferably displays four separate plots (described below). The vertical axis of graph 200 represents signal strength (RSSI) and the horizontal axis tracks call information and time. More specifically, the spacing on the horizontal axis is based on the amount of data, i.e., the amount of call information for a particular call, that there is to plot. The time indication at the bottom right-hand side of graph 200 corresponds to the time of the current message, or call information, being plotted. This time indication is stepped over to the next (leftward) vertical division line after, e.g., 10 messages are received. The receipt of 10 messages, however, may cover 10 seconds or 30 seconds depending on the nature of the call. For example, if a mobile phone user is stationary with stable signal strength and stable BER, very few changes in call performance data will likely be recorded at the switch. On the other hand, if the user is driving in an urban area while making several calls over a short period of time, numerous "end call", "new call" messages and cell site hand off events will be recorded by the switch and the graph being plotted will move more quickly to the left as compared to a graph plotting the call of the stationary user.

The reverse and forward signal strengths 205, 210 of the active, or serving, cell site are also plotted in graph 200 of FIG. 4a. It is noted that a call's forward signal strength, i.e., the strength of the signal from the cell site to the mobile phone is available only in a digital cellular system (since in such a system the mobile phone returns that information back to the cell site and the information ultimately makes its way to the MTSO, or switch).

In this case, the serving cell site is called "TO17C", which is indicated both at the top of graph 200 and at the bottom of the screen in text box 261. In a color display environment, each plot is preferably color coded for improved readability, and the color associated with each plot is indicated by the small horizontal bars at the top of FIG. 4a. The mobile service subscriber's telephone number is also indicated at the lower left of the screen in text box 260. This is the telephone number of the mobile telephone for which call monitoring is occurring.

Also plotted in graph 200 are the two "neighboring" cell sites 215 and 220 having the highest reverse signal strengths as compared to all other possible cell sites, after the serving cell site. In this case, cell sites "T017B" and "T005B" have the highest signal strengths ("Mobile Scan") and, accordingly, their data is plotted also in graph 200. Meanwhile, the text boxes at the bottom of the screen also indicate in numerical format in text boxes 270 the signal strengths at the two neighboring cell sites as well as of all other cell sites for which the switch has data for the call being monitored.

Relatively thick vertical bars 230 and 240 indicate a call event such as a hand off or dropped call. The code associated with the call event, e.g., "RR=05" is indicated next to vertical bars 230 and 240 and an explanation of that code may also be indicated in text box 280 just below graph 250.

Graph 250 plots the power level of the mobile phone and the reverse and forward BER. In an analog system, however, BER is not a relevant factor. Accordingly, when an analog system is analyzed, the "plot" of this parameter is set to "−1."

The bottom of screen of FIG. 4a indicates in various text boxes the MIN being monitored in text box 260 and the serving cell site in text box 261. The channel over which the call is taking place is also indicated in text box 262. The current numerical values of the forward and reverse BER and signal strengths are provided in text boxes 263–266. The channel type (digital or analog) is shown in text box 267 as is the current power level of the mobile phone in text box 268. The numerical values of the signal strengths at all neighboring cell sites are also shown. According to the digital EIA/TIA 136 specification, up to 24 neighbors are permitted. Accordingly, there preferably are 24 individual text boxes 270. In the example shown, only 10 neighbor cell sites are enabled.

Finally, at the bottom right hand corner of the screen display is a sound enable button 290, which when set, causes a predetermined relatively short "audible" indication of a call event that is occurring. For example, if there is a call hand off, a sound card (not shown) in workstation 20 generates the words "hand off" and plays the words at the same time the call event is depicted in graph 200. In this way, even if the RF or cellular engineer is not watching the display screen and graphs being plotted, he will be timely notified of a call event.

It will be appreciated by those skilled in the art that the "look and feel" of the exemplary screen of FIG. 4a could be reconfigured in any way found to be pleasing to a user. The actual configuration shown, i.e., how the various data is presented to a user, is provided for example purposes only. The scope of the present invention is not intended to be limited in way by the exemplary screen displays depicted and described.

Figure 4B:
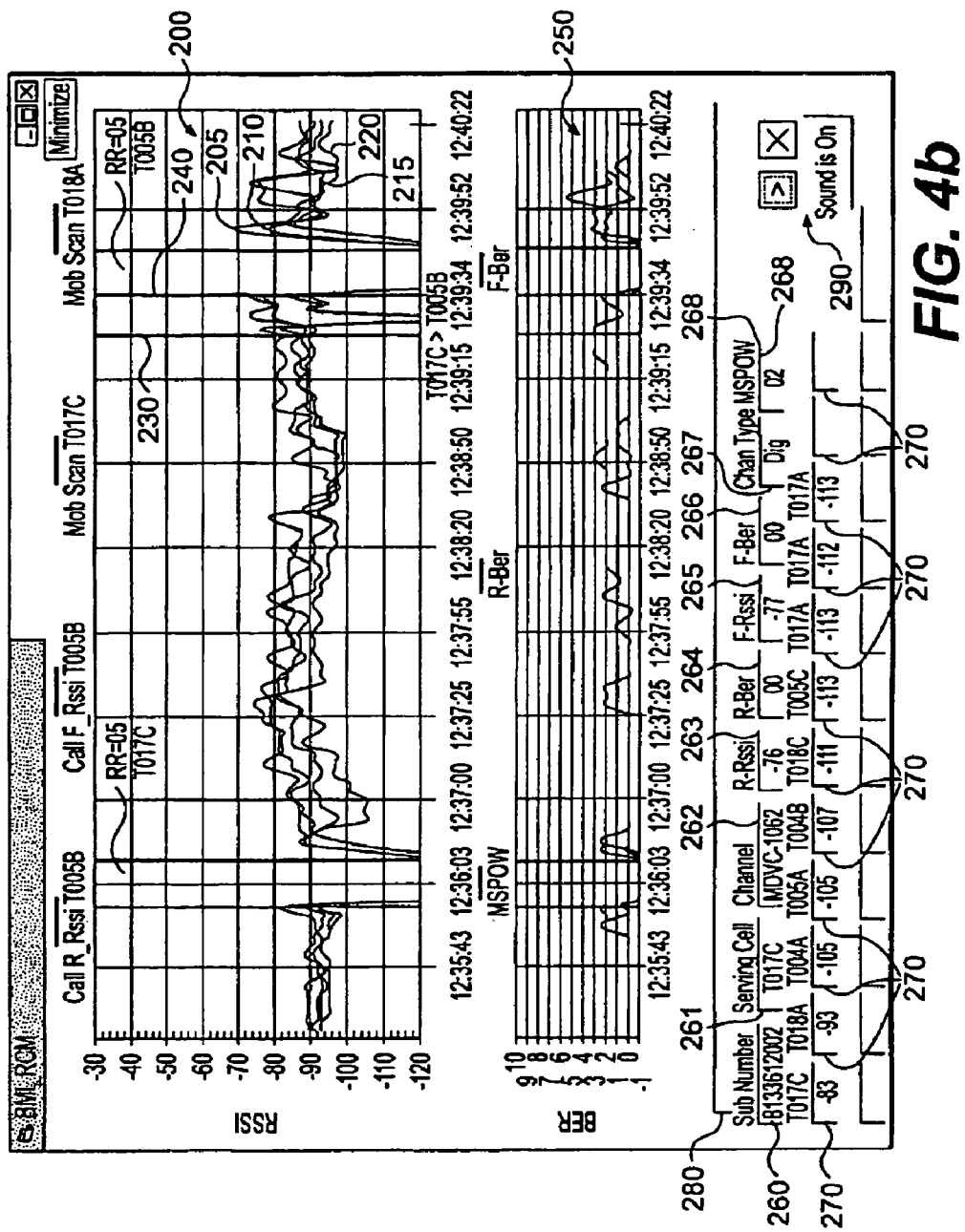

FIG. 4b shows what the exemplary screen of FIG. 4a looks like after a period of time. That is, as data is received from switch 12 the plots on graphs 240 and 250 move toward the left, whereby the most recent call monitoring information is displayed on the right hand side of the graphs. In this way, a dynamic graphical user interface is provided for a user.

Figure 5:
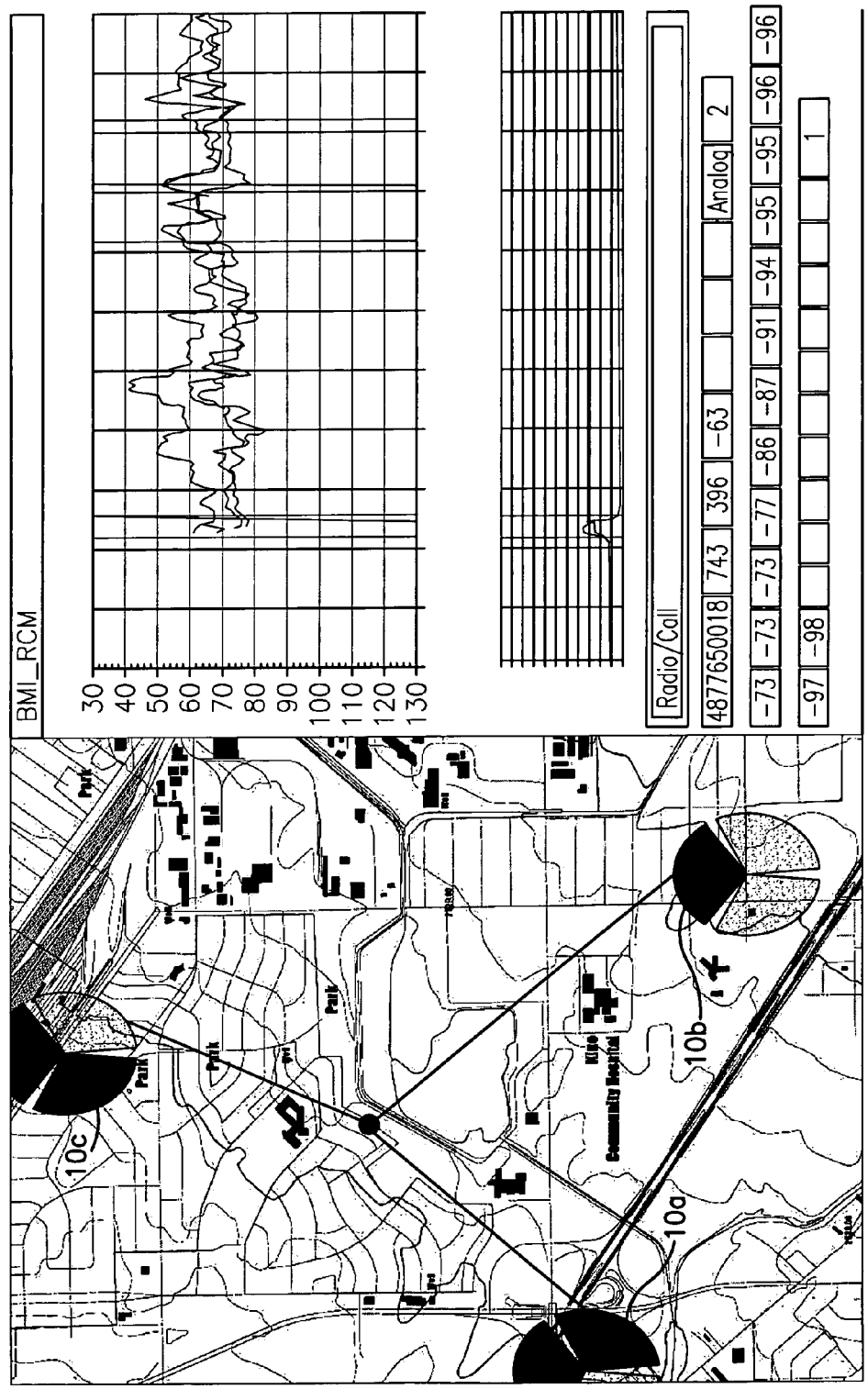
FIG. 5 is another exemplary display generated by the preferred embodiment of the present invention in which both call information and location information are displayed.

FIG. 5 depicts an exemplary split screen display in accordance with the present invention in which the GPS location information is utilized. The right-hand side of the screen is a display such as the one shown in FIG. 4a or 4b, albeit somewhat compressed to fit into a half-screen space. On the left-hand of the display a map is shown with the position 500 of mobile telephone 14 plotted thereon. Also plotted are the locations of several cell sites 10a, 10b and 10c. Using the data from the serving and neighboring cell sites, color coded markings are used to indicate the received signal strengths at each of three cells sites 10a, 10b and 10c. Thus, the cellular engineer can quickly and easily identify, via a graphical representation, which cell site is the serving cell site and which are neighboring cell sites along with the actual geographical locations of those cell sites. Other cell sites may also be shown on the map. Software for the mapping functionality described herein is well known and can easily be found commercially.

Figure 6:
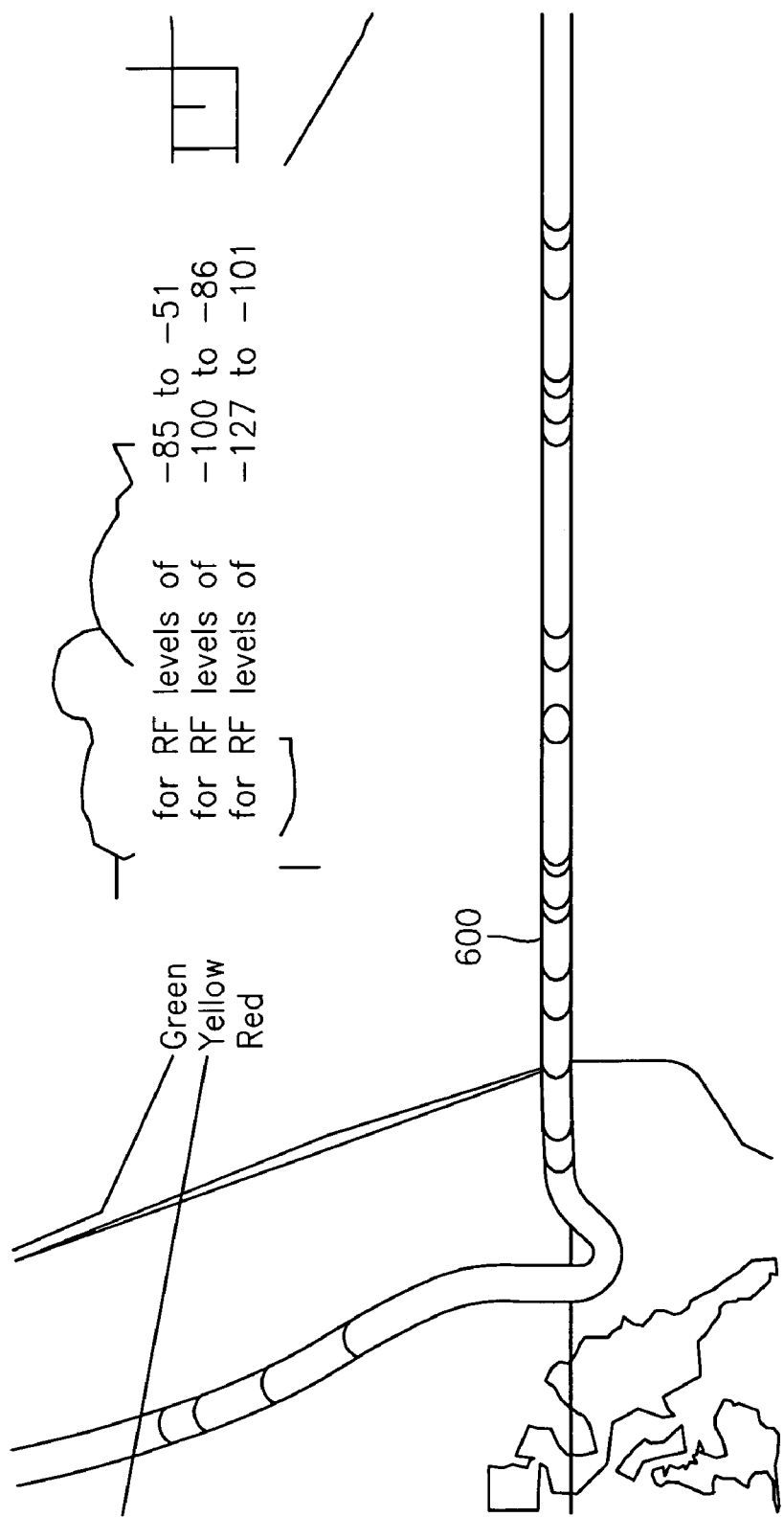
FIG. 6 is yet another exemplary display generated by the preferred embodiment of the present invention in which call information along a particular path of a vehicle is presented.

FIG. 6 depicts yet another type of display that utilizes the GPS location information transmitted back through the cellular system by mobile telephone 14 or mobile telephone 52. On this map, a data "trail" 600 is plotted that follows the route of the mobile telephone and plots signal strengths (RF levels) or BER. Color codes are preferably assigned to different value ranges whereby the cellular engineer can easily see how telephone call parameters are changing along a particular route.

Figure 7:
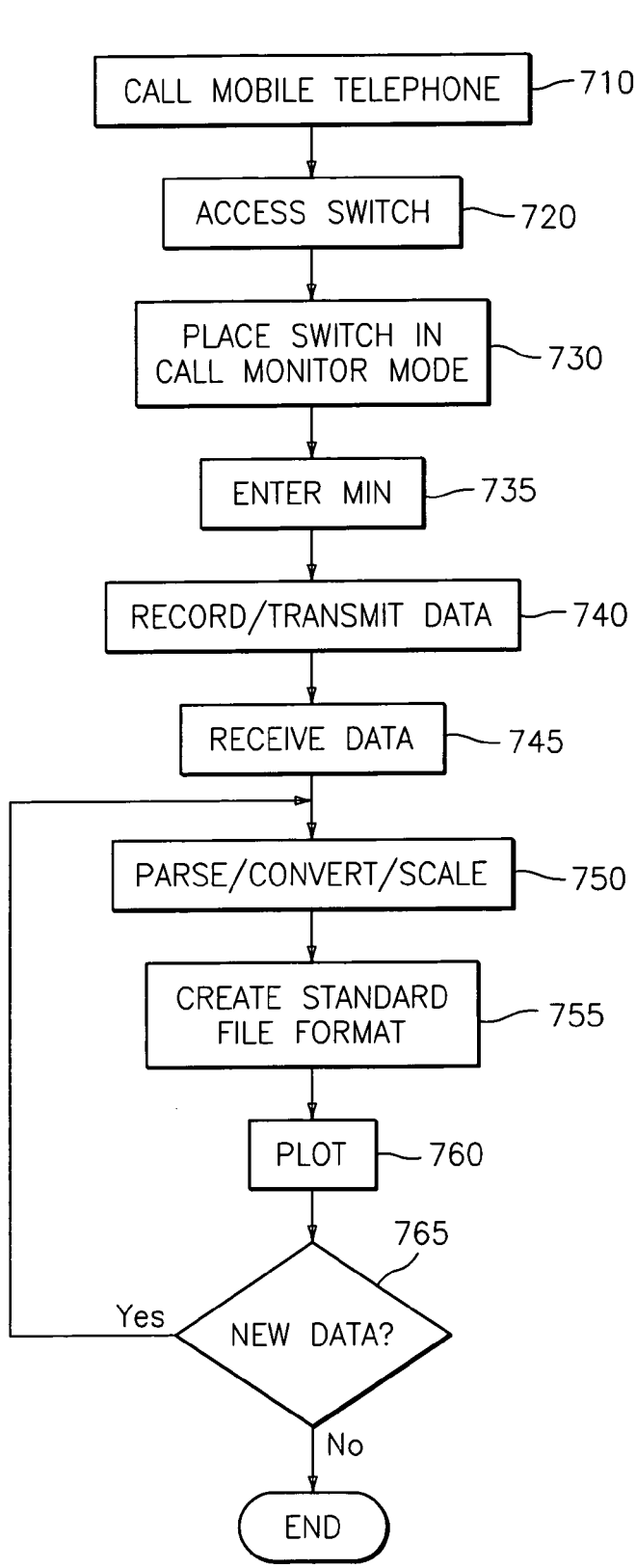
FIG. 7 is a flowchart depicting the method of the preferred embodiment of the present invention.

FIG. 7 is a flowchart depicting the method of the present invention. In step 710 one or both mobile telephones 14 and 52 is called and is automatically answered. At step 720 workstation 20 remotely accesses switch 12 via links 22a and 22b. As described above, links 22a and 22b can be implemented via modem or other link, e.g., a LAN, a WAN or the Internet. At step 730, switch 12 is placed into a call monitor mode. At step 735, a MIN is provided to switch 12. Switch 12 thereafter records and transmits to workstation 20 call monitor information related to the identified MIN, step 740, including the GPS location information. At step 745, the data is received at workstation 20 and preferably stored in a temporary file as necessary. At step 750 the stored data is parsed, converted and/or scaled to place the data in a common format that can be easily plotted and displayed. During step 755, a standard format file or database is populated with the parsed, converted and/or scaled data from step 750 and then at step 760 the call monitor information is plotted and displayed, e.g., in a graphical user interface similar to the forms shown in FIGS. 4a–6. At step 765 it is determined whether any new call monitor (parameter) information has since been received. If not, the process ends. If there is new data (new call monitor information) that has since been received, then the process returns to step 750 where the new call monitor information is parsed, converted and/or scaled.

It is noted that the data from the switch may not be received in actual "real time." There may be download delays due to, e.g., switch traffic, whereby the switch may not be able to immediately (i, in actual real time) transmit the data to workstation 20. Generally speaking, however, there is usually not more than a one or two minute delay and thus a substantially real time remote call monitoring system is achieved by the present invention. Delay in the receipt of data from the switch does not cause any problems with respect to the GPS location information since that information is received with a timestamp that permits synchronization with the call parameter information being received.

The foregoing disclosure of the preferred embodiment of the present invention has been presented for purposes of illustration and description. It is not intended to be exhaustive or to limit the invention to the precise forms disclosed. Many variations and modifications of the embodiment described herein will be obvious to one of ordinary skill in the art in light of the above disclosure. The scope of the invention is to be defined only by the claims appended hereto, and by their equivalents.

What is claimed is:

1. A method of monitoring a cellular call, comprising:
   remotely accessing a switch at a first location, the switch servicing one or more cellular sites in a cellular system;
   remotely placing the switch in a call monitor mode to monitor a mobile telephone;
   recording, at the switch, call information related to a cellular call being conducted by the mobile telephone;
   transmitting the call information to a second location;
   storing, at the second location, the call information as data in a standard file format; and
   displaying the data in a graphical format,
   wherein the call information includes position information for the mobile telephone;
   wherein displaying the data in a graphical format includes displaying call information for a serving cell site and neighboring cell sites, the displaying including displaying color coded markings indicative of received signal strength at the serving cell site and the neighboring cell sites.

2. The method of claim 1, further comprising receiving position information via a GPS receiver.

3. The method of claim 2, further comprising transmitting the position information over the cellular system.

4. The method of claim 1, wherein at least one of the remotely accessing, remotely placing and transmitting occurs over at least one of a hard wire and a wireless link.

5. The method of claim 1, wherein the displaying comprises displaying at least one of call signal strength and bit error rate.

6. The method of claim 1, wherein the displaying comprises displaying a plot of signal strength and a plot of bit error rate.

7. The method of claim 1, wherein the graphical format includes a map.

8. The method of claim 1, further comprising at least one of parsing, converting and scaling the call information to generate the data.

9. The method of claim 1, further comprising displaying the identity of a serving cell site that is the cell site over which the cellular call is taking place.

10. The method of claim 1, further comprising displaying on a map a serving cell site and cell sites that neighbor the serving cell site.

11. The method of claim 1, further comprising plotting a graph of the data and indicating when a call event has occurred.

12. The method of claim 1, further comprising the step of providing an audible indication of a call event.

13. The method of claim 1, wherein:
   displaying the data comprises presenting a first graph illustrating the reverse and forward signal strengths associated with a mobile device and a serving cell site involved in the cellular call, the first graph further illustrating reverse signal strengths of at least two cell sites neighboring the serving cell site,
   wherein displaying the data further comprises presenting a second graph, simultaneously, and in temporal alignment, with the first graph, illustrating bit error rate (BER) being experienced by the cellular call, and
   wherein both the first and second graphs respectively illustrate at least one vertical line extending from a top to a bottom of the respective graph that is indicative of a call event that occurred with respect to the cellular call, the at least one vertical line illustrated on the first graph being horizontal registration with the vertical line on the second graph, whereby correlation between the first and second graphs, at least with respect to a call event, is facilitated.

14. The method of claim 1, wherein:
   the displaying includes displaying color coded markings indicative of received signal strength at the serving cell site and the neighboring cell sties in a split screen display along with a graph of signal strength versus time.

15. A system for monitoring call performance in a cellular telephone system, comprising:
   a cellular switch operable to be remotely placed in a call monitor mode, said switch father being capable of recording cellular system information upon being placed in the call monitor mode and subsequently downloading recorded cellular system information;
   a GPS receiver connected to a first mobile telephone via an interface unit; and
   a first computer including a display, the first computer being operable to (i) remotely access the switch, (ii) remotely place the switch in the call monitor mode, (iii) receive and store recorded cellular system information and GPS location information relative to the first mobile telephone and (iv) graphically display the call information in combination with the GPS location information;
   wherein the graphical display includes call information for a serving cell site and neighboring cell sites, the display including color coded markings indicative of received signal strength at the serving cell site and the neighboring cell sites.

16. The system of claim 15, wherein the first mobile telephone is configured to be in an auto-answer mode.

17. The system of claim 15, further comprising a second mobile telephone and second computer each connected to the interface unit.

18. The system of claim 17, wherein the second computer records call parameter information available from the first mobile telephone.

19. The system of claim 17, wherein the second mobile telephone is configured to be in an auto-answer mode.

20. The system of claim 15, wherein the first computer is operable to display the cellular system information and GPS location information in real or near real time.

21. The system of claim 15, wherein at least one of the first and second computers is operable to perform at least one of parsing, converting and scaling the call information.

22. The system of claim 15, wherein the first computer is operable to graphically display at least one of signal strength, bit error rate and call events of a cellular call and a map including the location of the first mobile telephone.

23. The system of claim 15, wherein the first computer is operable to simultaneously display the signal strengths of cell sites that neighbor a serving cell site.

24. The system of claim 15, wherein the first computer is operable to audibly indicate when a call event has occurred.

25. The system of claim 15, wherein:
   the display includes a first graph illustrating the reverse and forward signal strengths associated with a mobile device and a serving cell site involved in the cellular call, the first graph further illustrating reverse signal strengths of at least two cell sites neighboring the serving cell site, the display including a second graph, simultaneously, and in temporal alignment, with the first graph, illustrating bit error rate (BER) being experienced by the cellular call, and wherein both the first and second graphs respectively illustrate at least one vertical line extending from a top to a bottom of the respective graph that is indicative of a call event that occurred with respect to the cellular call, the at least one vertical line illustrated on the first graph being horizontal registration with the vertical line on the second graph, whereby correlation between the first and second graphs, at least with respect to a call event, is facilitated.

26. The system of claim 15, wherein:

the display includes color coded markings indicative of received signal strength at the serving cell site and the neighboring cell sties in a split screen display along with a graph of signal strength versus time.

* * * * *